United States Patent
Gravel et al.

(10) Patent No.: US 12,539,547 B2
(45) Date of Patent: Feb. 3, 2026

(54) TIP DRESSING INSTALLATION SYSTEM AND METHOD

(71) Applicant: MAGNA INTERNATIONAL INC., Aurora (CA)

(72) Inventors: Sylvain Gravel, West Lorne (CA); Gary Livingston, Woodstock (CA)

(73) Assignee: MAGNA INTERNATIONAL INC., Aurora (CA)

( * ) Notice: Subject to any disclaimer, the term of this patent is extended or adjusted under 35 U.S.C. 154(b) by 664 days.

(21) Appl. No.: 17/619,495

(22) PCT Filed: Jun. 18, 2020

(86) PCT No.: PCT/EP2020/075662
§ 371 (c)(1),
(2) Date: Dec. 15, 2021

(87) PCT Pub. No.: WO2020/252578
PCT Pub. Date: Dec. 24, 2020

(65) Prior Publication Data
US 2022/0305581 A1 Sep. 29, 2022

Related U.S. Application Data

(60) Provisional application No. 62/862,778, filed on Jun. 18, 2019.

(51) Int. Cl.
*B23C 3/12* (2006.01)
*B23Q 17/00* (2006.01)
(Continued)

(52) U.S. Cl.
CPC ............... *B23C 3/12* (2013.01); *B23B 5/166* (2013.01); *B23C 2260/76* (2013.01); *B23K 9/26* (2013.01);
(Continued)

(58) Field of Classification Search
CPC ... Y10T 409/304144–304256; B23K 11/3063; B23B 5/166; B23C 3/12
(Continued)

(56) References Cited

U.S. PATENT DOCUMENTS 4,966,504 A * 10/1990 Seme, Jr. ............... B23K 11/36
409/140
4,966,506 A * 10/1990 Slanker ................... B23B 5/166
409/140
(Continued)

FOREIGN PATENT DOCUMENTS

DE 20200951 U1 * 7/2003
DE 10345714 A1 * 4/2005
(Continued)

OTHER PUBLICATIONS

Machine Translation JP 2003-334666 A, which JP '666 was published Nov. 2003.*
(Continued)

*Primary Examiner* — Erica E Cadugan
(74) *Attorney, Agent, or Firm* — DICKINSON WRIGHT PPLC

(57) ABSTRACT

A tip dressing system includes a tip dressing machine having a gear unit. A holder is installed in the gear unit, and a cutter is installed on the holder. The holder may include mechanical structure corresponding to the gear unit that prevents the holder from being installed incorrectly and further prevents a holder that does not match the machine from being installed in the gear unit. The cutter may include mechanical structure corresponding to the holder to prevents the cutter from being installed incorrectly and further prevents a cutter that does not match the holder from being attached to the holder. The machine, holder, and cutter may include indicators configured for being scanned by a scanning device,
(Continued)

and a controller may determine whether the scanned components match.

11 Claims, 10 Drawing Sheets

(51) Int. Cl.
    *B23B 5/16*     (2006.01)
    *B23K 9/26*     (2006.01)
    *B23K 11/30*     (2006.01)
    *B23K 11/36*     (2006.01)

(52) U.S. Cl.
    CPC ........ *B23K 11/3063* (2013.01); *B23Q 17/006* (2013.01); *Y10T 409/304256* (2015.01)

(58) Field of Classification Search
    USPC .................................................. 409/138–140
    See application file for complete search history.

(56) References Cited

U.S. PATENT DOCUMENTS

| | | | |
|---|---|---|---|
| 5,332,342 A | 7/1994 | Kizaki et al. | |
| 6,568,593 B2 | 5/2003 | Hetzer | |
| 8,899,888 B2 | 12/2014 | Nakajima | |
| 9,707,639 B2 | 7/2017 | Nakajima | |
| 2010/0136883 A1* | 6/2010 | Call | B23B 5/166 451/5 |
| 2015/0283645 A1* | 10/2015 | Moision | B23B 5/166 409/131 |
| 2016/0089747 A1* | 3/2016 | Tezawa | B23K 11/3063 407/2 |
| 2018/0272458 A1* | 9/2018 | Tezawa | B23B 5/166 |
| 2020/0398351 A1* | 12/2020 | Tezawa | B23B 5/166 |

FOREIGN PATENT DOCUMENTS

| | | | |
|---|---|---|---|
| DE | 102011002664 A1 | * | 7/2012 |
| GB | 1380301 A | * | 1/1975 |
| JP | 2001-287046 A | * | 10/2001 |
| JP | 2003-334666 A | * | 11/2003 |
| JP | 2011224597 A | | 11/2011 |
| JP | 6154313 B2 | | 6/2017 |
| JP | 2017213590 A | | 12/2017 |
| KR | 101576593 B1 | | 12/2015 |
| WO | WO-2017/094041 A1 | * | 6/2017 |

OTHER PUBLICATIONS

Machine Translation of DE 10345714, which DE '714 was published Apr. 2005.*

* cited by examiner

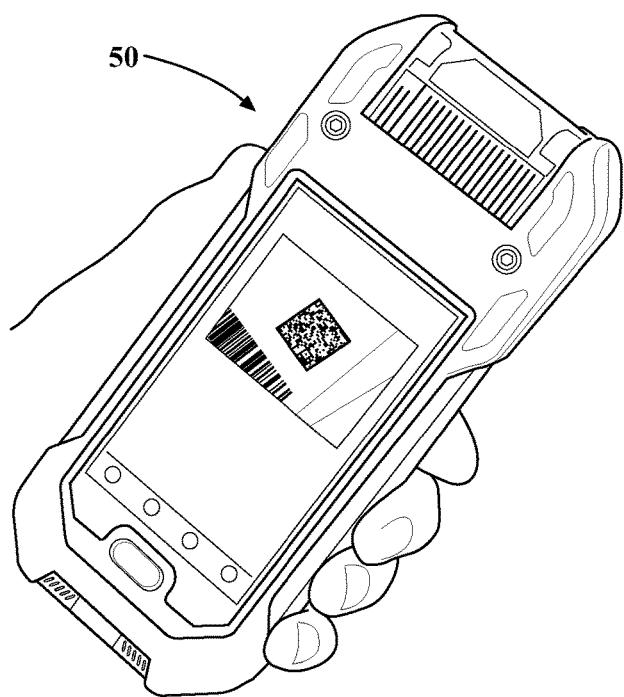
FIG. 11A
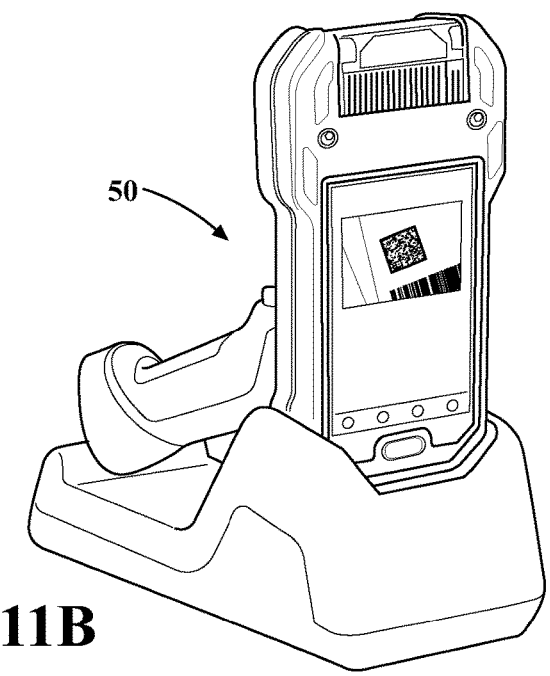
FIG. 11B
FIG. 11C
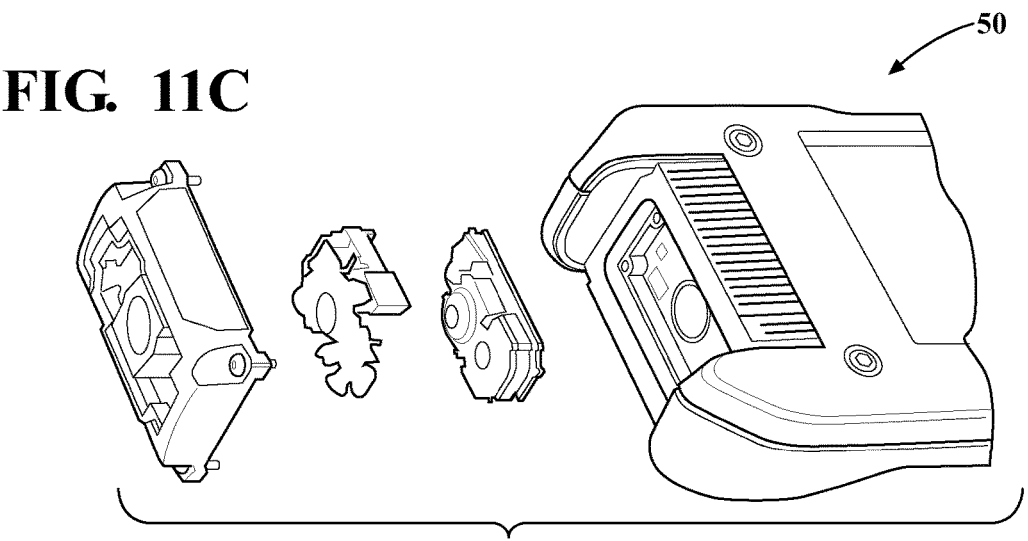

TIP DRESSING INSTALLATION SYSTEM AND METHOD

This U.S. National Stage Patent Application claims the benefit of PCT International Patent Application Serial No. PCT/CA2020/050842 filed Jun. 18, 2020 entitled "TIP DRESSING INSTALLATION SYSTEM AND METHOD" which claims the benefit of and priority to U.S. Provisional Patent Application Ser. No. 62/862,778, filed Jun. 18, 2019, titled "Tip Dressing Installation System And Method," the entire disclosures of which are hereby incorporated by reference.

CROSS-REFERENCE TO RELATED APPLICATIONS

This PCT International Patent Application claims the benefit of and priority to U.S. Provisional Patent Application Ser. No. 62/862,778, filed Jun. 18, 2019, titled "Tip Dressing Installation System And Method," the entire disclosures of which is hereby incorporated by reference.

TECHNICAL FIELD

The present disclosure relates to welding systems. More particularly, the present disclosure relates to a weld tip dressing system and method for ensuring proper installation of a tip dress cutter and holder.

BACKGROUND OF THE DISCLOSURE

Industrial applications frequently involve the use of welding to join two different parts together in a robust and efficient manner. Various types of welding operations are common through various industries.

One type of welding is known as metal inert gas (MIG) welding, in which a consumable electrode is fed through a welding system, including through a welding cable and a contact tip of weld gun, with the contact tip disposed within the nozzle at the end of the weld gun. Gas is also fed through the welding cable and nozzle of the weld gun. An electric current is passed through the welding system and the contact tip, which melts the consumable electrode in a weld puddle. The gas exits the nozzle and shields the contact tip and the electrode during the welding operation.

MIG welding may be used in applications in which two components may be joined at a butt joint such that a seam may be created therebetween by welding. As the welding gun travels along the seam, the consumable electrode is melted into the seam, thereby joining the two components along the path of the seam.

Another type of welding is spot welding, in which a contact tip is heated by a current passing therethrough, similar to MIG welding. However, in spot welding, a consumable electrode is not passed through the contact tip. Rather, the contact tip is heated, which heats the components being welded together such that they are joined at the location of the contact tip. Spot welding is typically used to weld together a pair of components that overlap, and the welded spots are generally disposed at discrete locations, unlike the extended length of the seam provided by MIG welding. Spot welding is common in many automotive applications, such as for joining sheet metal components.

In MIG welding, the consumable electrode is melted and introduced into the seam between the two components to be joined. Accordingly, the contact tip tends not to undergo any substantial physical forces. However, over time, weld spatter may accumulate on the contact tip, which can reduce the effectiveness of the contact tip and its ability to provide a sufficient amount of heat to the consumable electrode. Accordingly, the contact tip must be cleaned after extended use, such that the accumulated weld spatter from the electrode can be removed. In some cases, the spatter may be manually scraped away from the contact tip.

In spot welding, there is no consumable electrode and therefore weld spatter issues are not present after extended use. However, extended use of the contact tip in spot welding will still require maintenance of the contact tip. During a spot welding operation, the contact tip is pressed and forced against the components being welded, and the contact tip becomes hot. Repeated pressure on the contact tip when hot can thereby cause the contact tip to become deformed relative to its intended shape.

The deformed shape of the contact tip after repeated use cannot be treated in the same manner as a MIG welding tip, because the degradation of the tip's effectiveness is not due to buildup that can simply be scraped away. Rather, the contact tip degradation from spot welding may be "dressed."

Tip dressing is the method of repairing or reforming the contact tip used in spot welding. In a tip dressing operation, the contact tip may be re-shaped by cutting the contact tip with a tip dress cutter. The tip dress cutter may be a blade having a shaped edge that when rotated around the contact tip will cut away the misshapen material of the contact tip.

The tip dress cutter may be held in place by a holder. The holder component is attached to a gear unit. The gear unit is driven rotationally, thereby rotating the holder and the tip dress cutter mounted thereto. This process of dressing the misshapen contact tip may be performed on a machine that will rotate the tip dress cutter and holder at a high speed.

The resulting shape of the contact tip after dressing is dependent on the shape of the tip dress cutter. The tip dress cutter must be specifically selected to match the holder, such that the holder and the tip dress cutter correspond to the type of contact tip and desired shape. Similarly, the correct holder must be attached to the machine. Moreover, the tip dress cutter must be attached in the proper orientation relative to the holder.

However, it can be difficult to ensure that the correct holder and tip dress cutter are selected for the specific contact tip that requires dressing. Tip dress cutter blades typically appear generally similar to each other. The various holder components also appear similar to each other. When a tip dress cutter blade is replaced, there is the potential for the incorrect blade to be installed, which can result in the improper dressing of the contact tip, resulting in an incorrect weld and/or lost production time.

In view of the above, improvements can be made to tip dressing systems.

SUMMARY OF THE INVENTION

In one aspect, a tip dressing system for a contact tip is provided, the system comprising: a gear unit configured for being driven by a tip dressing machine, the gear unit defining an opening extending axially therethrough; a holder sized and configured for being received in the opening of the gear unit and for being fixedly attached thereto; a cutter sized and configured for being fixedly attached to the holder; wherein the cutter, holder, and gear unit including corresponding structure allowing a correct installation and preventing an incorrect installation In one aspect, the holder includes an axial projection extending toward the gear unit; wherein the gear unit includes a hole configured to receive the axial projection of the holder; wherein the gear unit includes a radially extending projection extending into the opening; wherein, in a first position, the axial projection of the holder is received in the hole of the gear unit and the holder is fully disposed in the opening of the gear unit, and in a second position, the axial projection is aligned with the radial projection of the gear unit, and the holder is blocked from being fully disposed in the opening of the gear unit; wherein the cutter includes a first mounting hole and the holder includes a second mounting hole, wherein the cutter is attachable to the holder when the first and second mounting holes align, and the cutter is non-attachable to the holder when the first and second mounting holes are misaligned.

In one aspect, the holder has a partial annular body with a partial circumferential outer surface sized for being received within a circumferential inner surface of the gear unit, and the holder further includes a flange portion extending radially outward from the body.

In one aspect, the body is received within the inner surface of the gear unit and the flange portion abuts a corresponding surface of the gear unit in an axial direction when installed correctly, and the flange portion is prevented from abutting the corresponding surface when installed incorrectly.

In one aspect, the gear unit includes a radial projection extending radially inward from the inner surface, wherein the radial projection interferes with the body of the holder when installed incorrectly.

In one aspect, the holder includes an axial projection extending downward from the flange portion, wherein the axial projection is received within a corresponding hole when the holder is installed correctly.

In one aspect, the cutter has a radially inner and a radially outer end, wherein the radially outer end is wider than the radially inner end.

In one aspect, the cutter includes a hole disposed between the radially inner end and the radially outer end, wherein the hole is aligned with a corresponding hole of the holder when the cutter is installed correctly.

In one aspect, the hole is offset of the cutter axially relative to a center of the cutter when the cutter is installed correctly on the holder, and wherein the hole of the cutter is misaligned with the hole of the holder when the cutter is installed incorrectly.

In one aspect, the cutter further includes a wing portion, wherein the wing portion and the radially inner portion define a cutting edge.

In one aspect, the cutting edge is disposed adjacent a recess defined by the holder, wherein the recess is configured to receive a contact tip therein for tip dressing.

In one aspect, the system includes a tip dressing machine, wherein the gear unit is disposed within the tip dressing machine.

In one aspect, the tip dressing machine includes a sensor, wherein the sensor detects removal of the holder from the gear unit.

In one aspect, the machine in configured to not operate in response to removal of the holder, and wherein the machine is further configured to subsequently operate in response to confirming the correct holder is re-installed.

In another aspect, a method of installing a tip dress cutter in a tip dressing machine is provided, the method including the steps of: determining that a first cutter requires replacement, wherein the first cutter is attached to a holder, and the holder is attached to a gear unit of a tip dressing machine; selecting a replacement cutter for replacing the first cutter; removing the holder from the machine; scanning an indicator disposed on the tip dressing machine with a scanning device; scanning an indicator disposed on the holder with the scanning device; scanning an indicator disposed on the replacement cutter with the scanning device; in response to scanning the indicators on the tip dressing machine, the holder, and the replacement cutter, verifying, via a controller, that the tip dressing machine, the holder, and the cutter confirm a predetermined corresponding relationship; in response thereto, installing the cutter and holder in the machine.

In one aspect, the method includes detecting that the holder has been removing, and in response thereto, prohibiting activation of the machine until the cutter and holder are installed in the machine following confirmation of the predetermined corresponding relationship.

In one aspect, the step of detecting is performed by a sensor in communication with the controller.

In one aspect, the indicators are in the form of bar codes or QR codes.

In one aspect, the cutter includes an alignment feature corresponding to an alignment feature of the holder, wherein the respective alignment features are aligned when the cutter is installed correctly and the alignment features are misaligned when oriented incorrectly to prevent incorrect installation.

In one aspect, the holder includes an axial projection that interferes with the gear unit when the holder and gear unit do not satisfy the predetermined relationship.

In one aspect, the cutter includes a hole that aligns with a hole of the holder for receiving a fastener to attach the cutter to the holder, wherein the holes are misaligned to prevent installation via the fastener when the cutter and the holder do not satisfy the predetermined relationship.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 11A-C illustrates multiple view of a scanning device for use with the system to scan the cutter, the holder, and the machine;

DESCRIPTION OF THE ENABLING EMBODIMENT

Referring to FIGS. 1-16, a system 10 for dressing a contact tip (not shown) for use in welding systems is provided. The system 10 is configured to provide tip dressing of the contact tip, for example a contact tip used in spot welding, such that the contact tip can be re-conditioned or repaired after repeated use, thereby improving the quality of the welds over an extended period of time. The system 10 is configured to provide tip dressing that can be performed efficiently and with a reduction in downtime caused by maintenance of the system 10 and to reduce, limit, or prevent the incorrect selection and/or installation of the component parts of the system.

Figure 1:
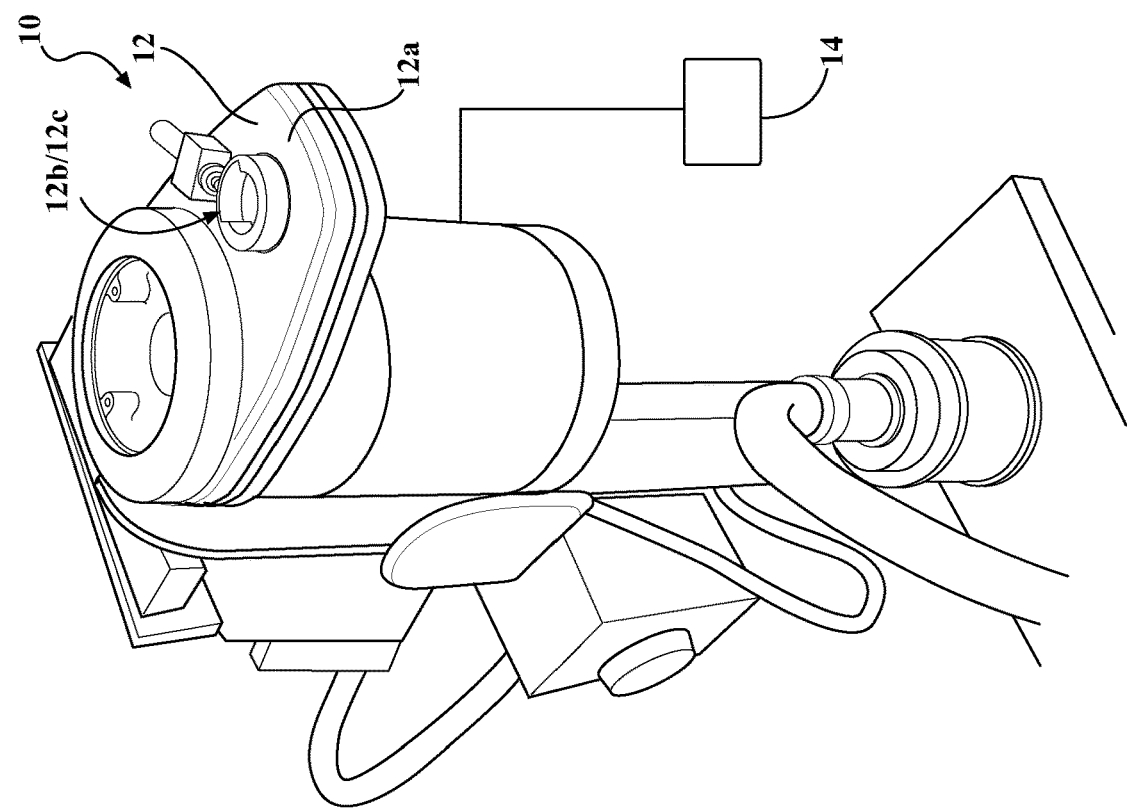
FIG. 1 is a perspective view of a tip dressing system.

With reference to FIG. 1, the system 10 may include a tip-dressing machine 12 and a controller 14 including a programmable logic controller (PLC). The controller 14 is configured to control the machine 12 and to determine that the machine 12 is properly configured with the correct components installed, as further described below. The controller 14 may be in the form of a computer having a memory and a processor and installed software configured to execute the functionality described herein. Various component parts of the controller may be disposed locally or remotely, such as via the internet, with the various component parts in communication so as to operate together to the extent necessary to accomplish the disclosed functionality.

Figure 3:
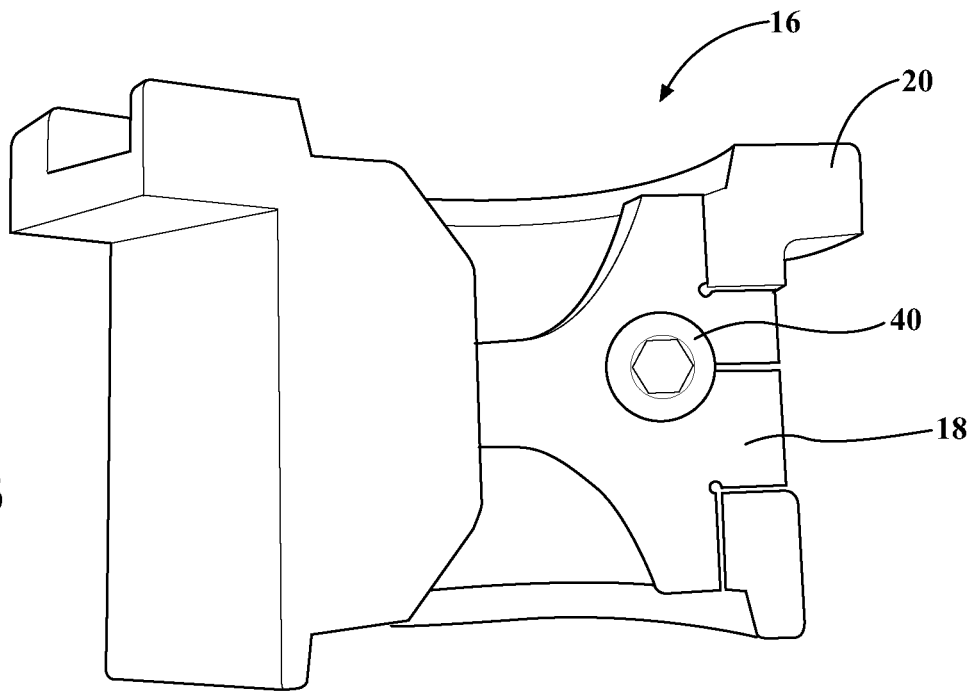
FIG. 3 is a perspective view of tip dress cutter and a holder.

The machine 12 includes a power supply (typically in the form of a conduit linked to a power grid, but may also be in the form of a generator, battery, or other power supply) that will operate the machine 12 in response to PLC controls. The machine 12 thereby may operate automatically to provide the tip-dressing functionality. The machine 12 may include various drives, gears and the like to provide rotatable movement to a tip-dressing mechanism 16 (FIG. 3). The tip-dressing mechanism 16 is installed in the machine 12 and is removable and replaceable to allow for maintenance thereof.

With reference to FIG. 3, the tip-dressing mechanism 16 may be in the form of an assembly of multiple components, include a cutter 18 and a holder 20. The cuter 18 is the element configured to contact the contact tip for dressing the contact tip during the tip dressing operation. The holder 20 operates to drive the cutter rotationally around the contact tip. The cutter 18 and holder 20 are configured such that the holder 20 will securely hold the cutter 18 in place relative to the holder 20. The cutter 18 may be removable and replaceable in response to extended use of the cutter 18, such that the cutter 18 may be replaced after becoming relatively dull or otherwise having reduced effectiveness.

Figure 4:
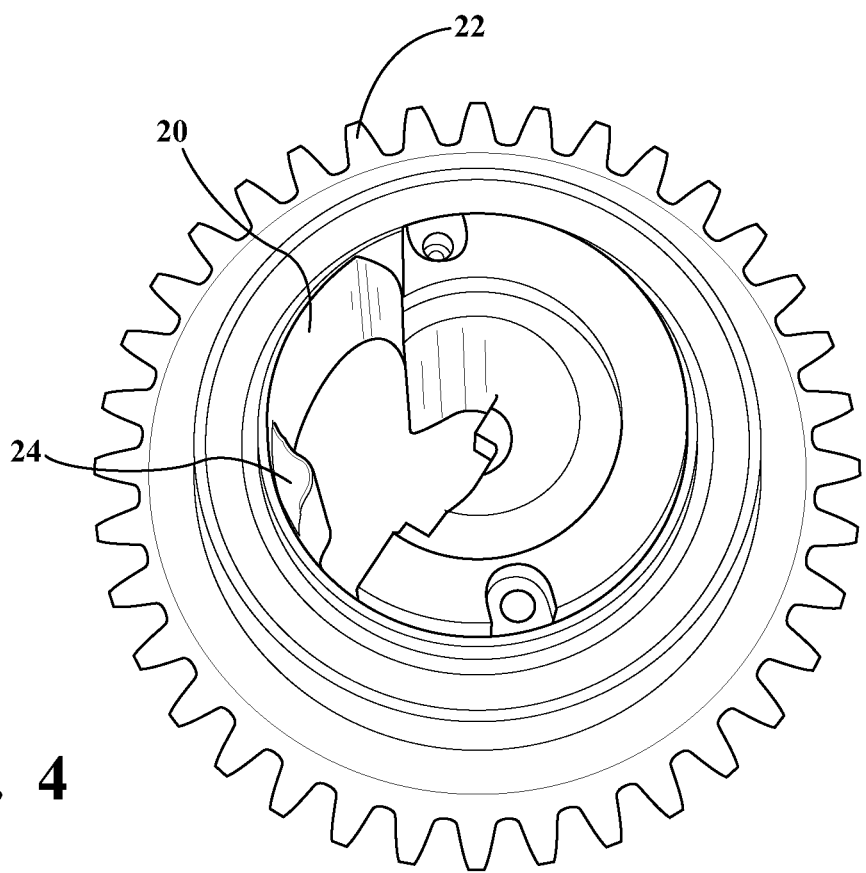
FIG. 4 is a perspective view of a gear unit of the machine and the holder disposed therein.
Figure 6:
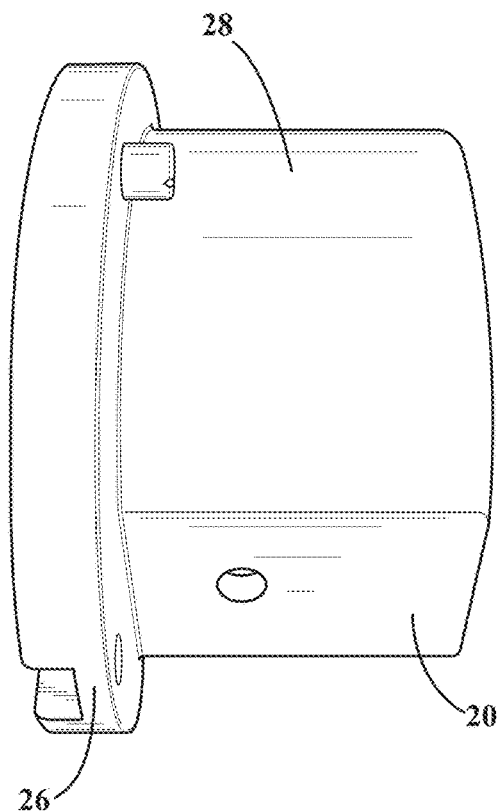
FIG. 6 is a side view of the holder, illustrating the pin projecting from a flange portion thereof.

The holder 20 may have a partial cylindrical or annular shape. Accordingly, the holder 20 may be disposed within and attached to a ring-shape gear unit 22 (FIG. 4). The holder 20 may include an outer circumferential surface that generally corresponds to an inner circumferential surface of the gear unit 22. The gear unit 22 is configured to rotate in response to activation of the machine 12. The holder 20 is fixed in place relative to the gear unit 22, such that rotation of the gear unit 22 causes concurrent rotation of the holder 20. The cutter 18, being mounted to the holder 20, thereby rotates in response to rotation of the gear unit 22 as well.

The gear unit 22 may be substantially disposed within a housing 12a of the machine 12 (FIG. 1). The housing 12a of the machine may include an opening that provides access to a portion of the gear unit 22 (such as the portion to which the holder 20 is mounted), thereby permitting installation and removal of the holder 20 from the gear unit 22 without necessitating removal of the gear unit 22 itself. The gear unit 22 may have a generally annular shape with a hole or opening extending axially through the middle of the gear unit 22 for receiving the holder 20.

The holder 20 is configured to be placed within the hole or opening in the middle of the gear unit 22. The holder 20 may include an outer surface having a diameter or radius that generally corresponds to the diameter of the hole or opening of the gear unit 22. It will be appreciated that the diameter of the holder 20 may be slightly smaller than the opening to gear unit 22, such that the holder 20 may slide in and out of the opening.

As described above, the holder 20 is a partial cylinder or annular shape. Accordingly, the holder 20 may resemble a C-shape, or the like. The gear unit 22 may include a projection 24 that extends radially inward within the hole, and the projection 24 will not interfere with the holder 20 when holder 20 is placed within the gear unit 22 correctly, due to the holder 20 not extending in a complete circle. Put another way, the space defined by the partial circle shape of the holder 20 may accommodate the projection 24. The projection 24 extends radially inward an amount that does not interfere with the contact tip to be machined or the cutter 18.

Figure 5:
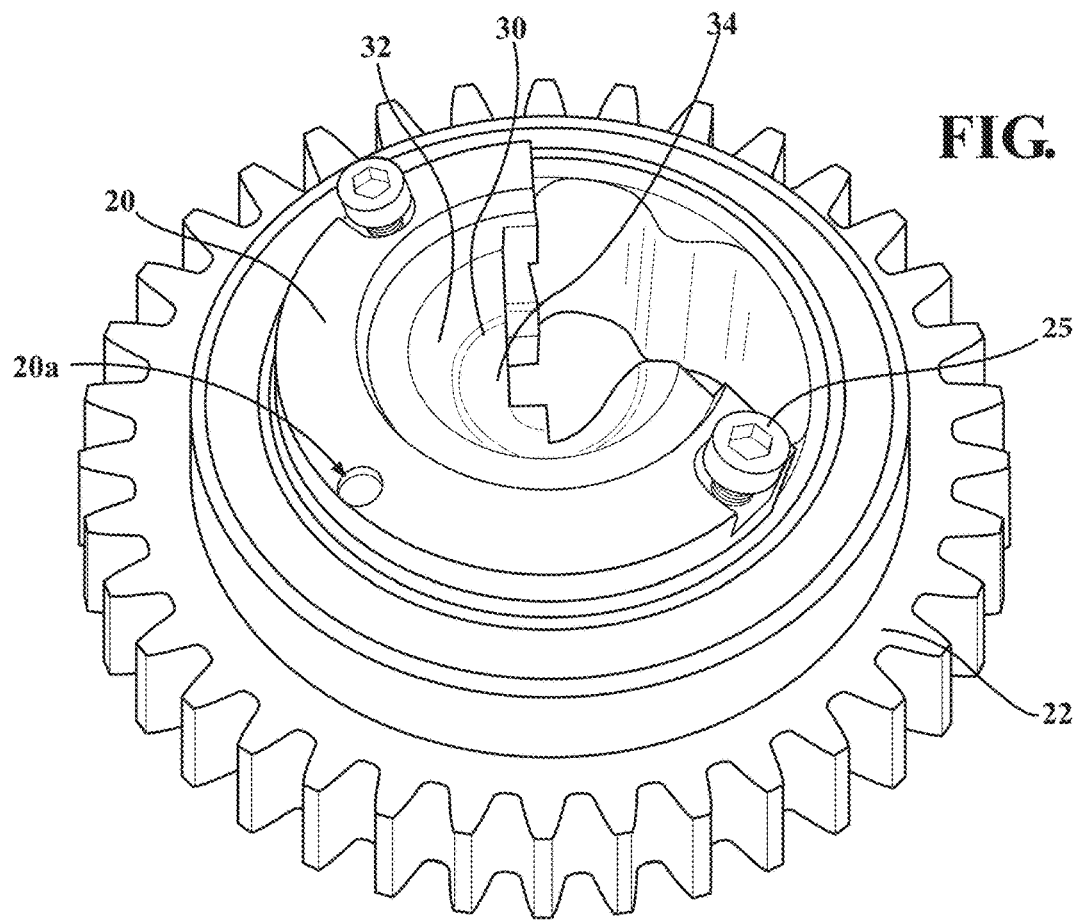
FIG. 5 is a perspective view of the holder and the gear unit, illustrating a pair of fasteners and a pin.
Figure 7:
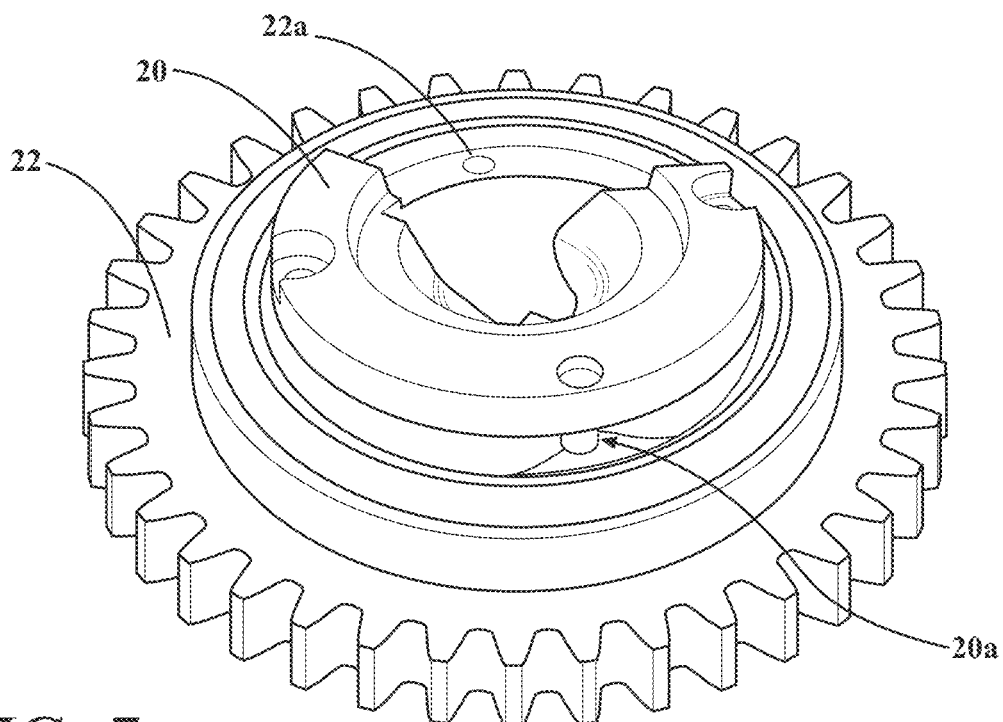
FIG. 7 is a perspective view illustrating the holder disposed in an incorrect installation location.
Figure 8:
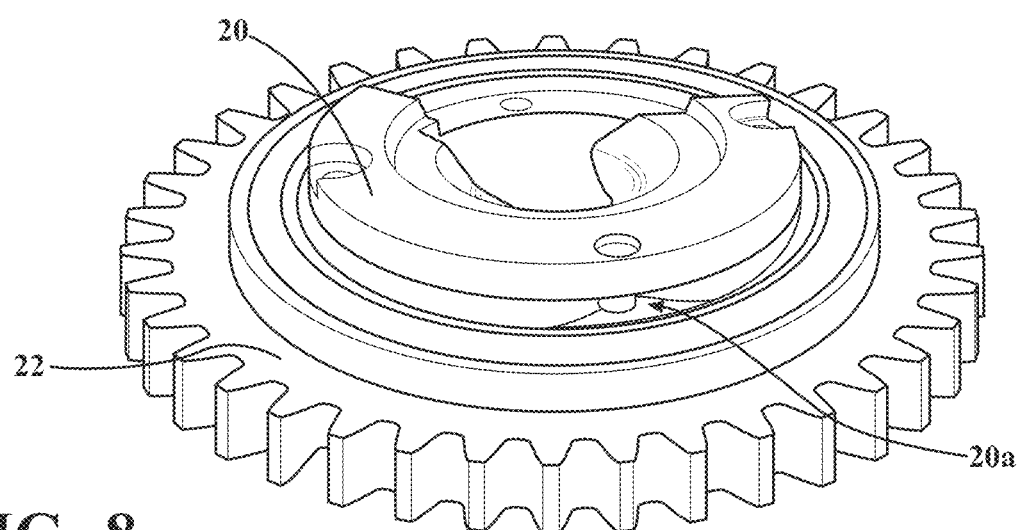
FIG. 8 is another perspective view of the holder disposed in an incorrect position.

As shown in FIGS. 5-8, in one aspect, the holder 20 is fixed to the gear unit 22 via a pair of fasteners 25, such as a screw or bolt, which extend through an upper flange 26 of the holder and into corresponding threaded recesses formed in the gear unit 22 (axially aligned with the fasteners 25 shown in FIG. 5). In one aspect, the fasteners 25 may be on diametrically opposite radial sides of the holder 20.

As described above, the holder 20 may include the upper flange 26. The upper flange 26 may extend radially outward from a body 28 of the holder. The upper flange 26 and body 28 may be part of a single unitary structure. The holder 20 may further define an upper recess 30, which may have a tapered wall 32 and a flat bottom portion 34. The recess 30 may be configured to receive the end of the contact tip that is to be treated and dressed by the tip dressing mechanism 16. The upper flange 26 is configured to abut or be disposed adjacent a corresponding generally planar surface of the gear unit 22, such that the holder 20 will rest against the gear unit 22 in an axial direction when installed and mounted correctly.

Figure 9:
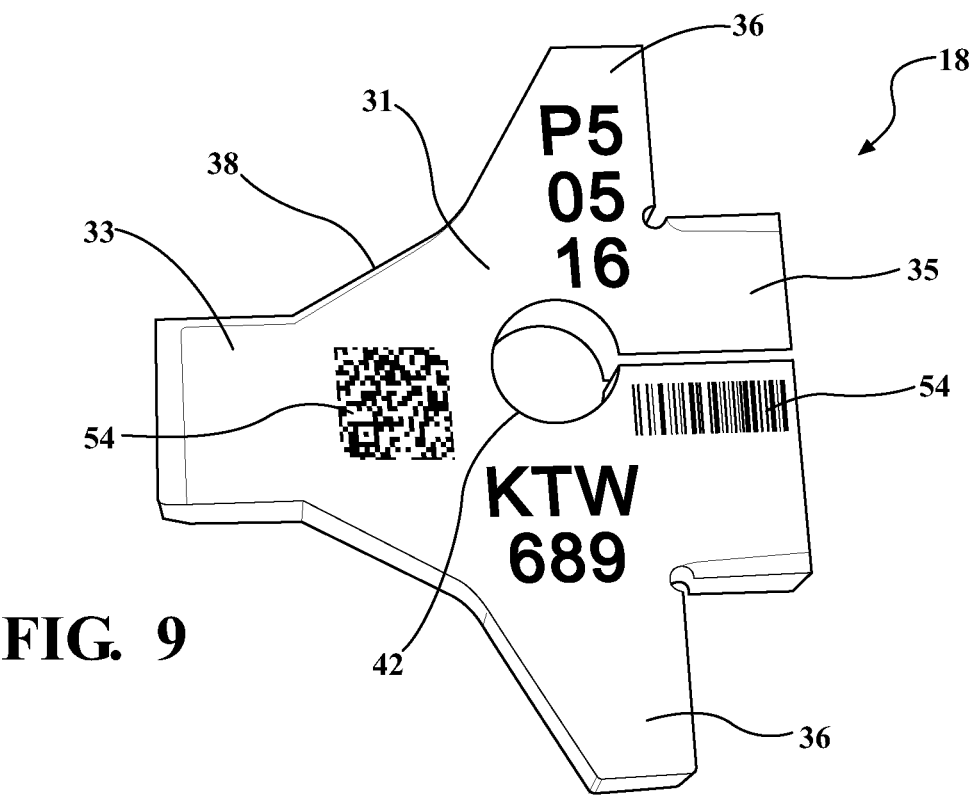
FIG. 9 is front view of the tip dress cutter, illustrating a cutter indicator disposed thereon.
Figure 10:
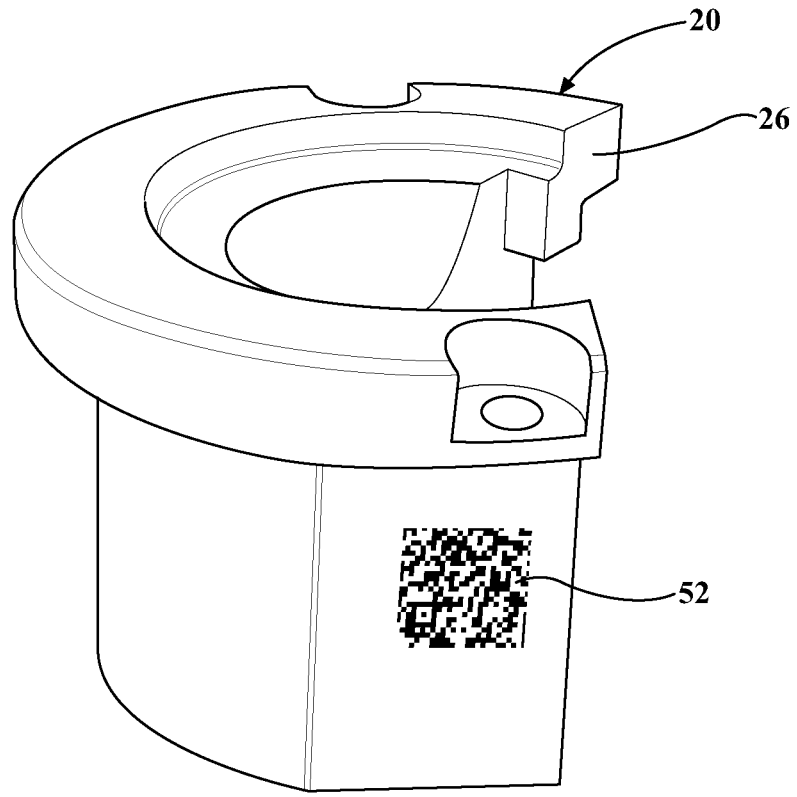
FIG. 10 is a perspective view of the holder, illustrating a holder indicator disposed thereon.

With reference to FIGS. 3, 9, and 10, the cutter 18 is configured to be secured to the holder 20 to define the tip dressing mechanism 16 when assembled. The cutter 18 may have a generally flat shape defining a main body portion 31. The cutter 18 further includes a radially inner end 33 and a radially outer end 35. The outer end 35 may be wider than the inner end 33. The radially inner end 33 is configured to be disposed near the axis of rotation of holder 20 and the gear unit 22. The radially outer end 35 is configured to be disposed radially closer to the inner circumference of the gear unit 22 than the radially inner end 33.

The cutter 18 may further include a pair of wing portions 36 that extend outward on opposite sides of the body portion 30. The wing portions 36 and the inner end 33 combine to define a cutting edge 38. When the cutter 18 is attached to the holder 20, the cutting edge 38 is disposed within the central space of the holder 20 adjacent the recess 30 of the holder 20, such that the cutting edge 38 will contact the end of the contact tip when the contact tip is inserted into the recess 30. Rotation of the holder 20 and cutter 18 will thereby rotate together to treat the end of the contact tip.

Both the holder 20 and the cutter 18 may be configured to aid in the correct installation and orientation relative to the components to which they are attached. Thus, the holder 20 may be configured such that it may be attached to the gear unit 22 when the holder 20 is orientated relative to the gear unit 22 in the correct orientation. Similarly, the cutter 18 may be configured such that it may be attached to the holder 20 when the cutter 18 is orientated relative to the holder 20 in the correct orientation.

The cutter 18 may be fixed to the holder 20 via a fastener 40 (shown in FIG. 3). The cutter may include a hole 42 through which the fastener 40 will extend, and the holder 20 may include a corresponding threaded recess (aligned with the fastener 40 shown in FIG. 3) to receive the fastener 40 therein. The outer end 35 and the wing portions 36 intersect at a corner that may cooperate with corresponding structure on the holder 20, as shown in FIG. 3. Thus, the cutter 18 may be placed against a flat mounting surface on the holder 20 and fixed to the holder 20 via the fastener 40. The outer end 35 may be specifically sized to fit within a corresponding recess formed in the holder 20. Thus, if the outer end 35 is too large, installation of the cutter 18 may not be possible. Similarly, the hole 42 of the cutter 18 may be specifically placed such that only the correct cutter 18 may be installed via the fastener 40 even if the outer end 35 fits within the holder 20. The structure of the cutter 18 described above that corresponds to the holder 20 may be referred to as cutter-holder structure. The structure of the holder 20 that corresponds to the cutter 18 may be described as holder-cutter structure.

The selection of the holder 20 and the cutter 18 for use as the tip dressing mechanism 16 when assembled depends on the contact tip that is being treated. For instance, some contact tips may be designed to have different widths or different curvatures at the tip. Accordingly, it is important to select the correct holder 20 and cutter 18 to be installed on the machine 12 to treat the specific contact tip. The system 10 may include features to track the components that are being installed, as further described below.

As described above, the system 10 includes the machine 12 and the controller 14. The system 10 may further include the use of a scanning device 50 (FIG. 11), such as the Cognex MX-1502 scanner, which may operate wirelessly relative to the controller 14, and which may utilize a common smartphone as its computer. The scanning device 50 may be configured to scan or read visual indicia, such as a bar code or QR code.

Figure 12:
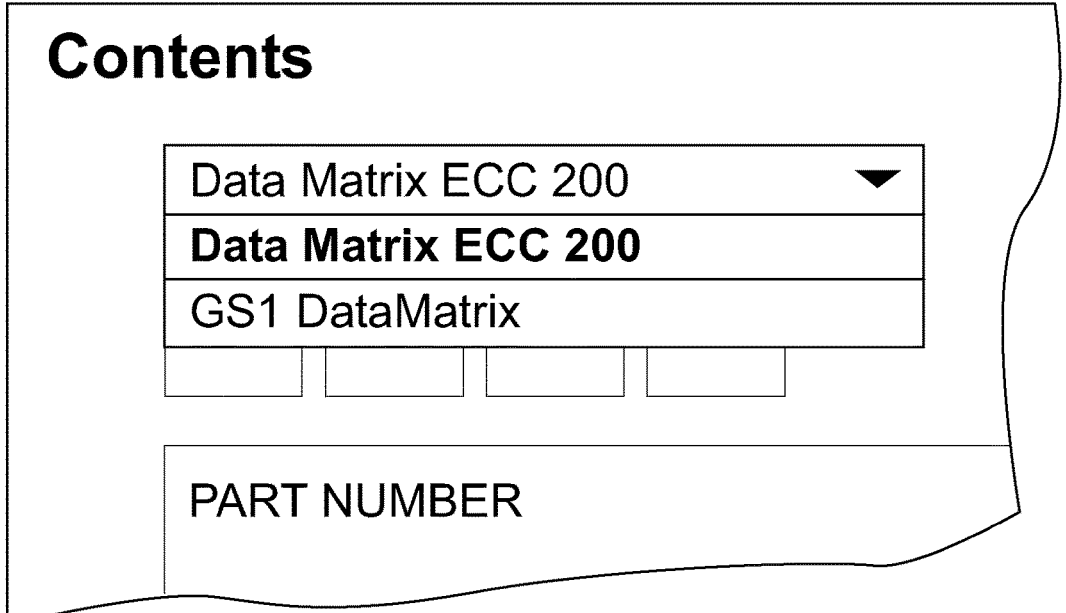
FIG. 12 illustrates a program for creating a bar code or other indicator for the holder, cutter, or machine.
Figure 13:
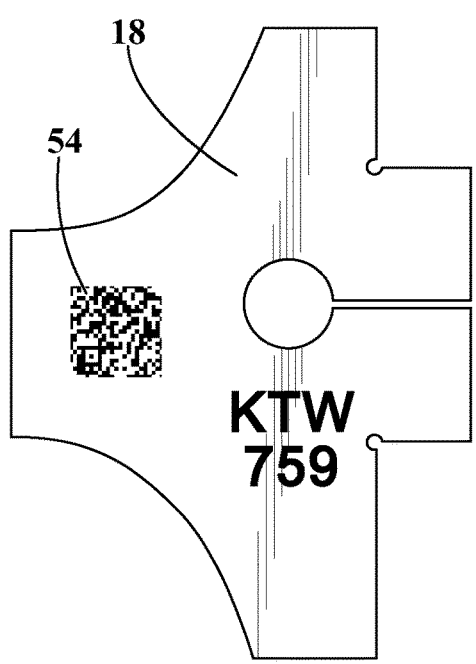
FIG. 13 illustrates the bar code of FIG. 12 disposed on the cutter.

As shown in FIGS. 9 and 10, the holder 20 may include a holder indicator 52 printed thereon or affixed thereto. The cutter 18 may include a cutter indicator 54 printed thereon or affixed thereto. The indicators 52, 54 may be in the form of visual indicia, such as a bar code or QR code that is readable or able to be scanned by the scanning device 50. Accordingly, the scanning device 50 may quickly and accurate identify the specific type of holder 20 and/or cutter 18 that is present. The indicators 52, 54 may be produced using a computer program, such as a program for producing a 2D matrix ECC 200 barcode, as shown in FIGS. 12 and 13.

When used with the controller 14 and the machine 12, the scanner 50 may help ensure that the correct holder 20 and cutter 18 have been selected. In the event the holder 20 and/or cutter 18 are not correct, the controller 14 may prevent the machine 12 from operating until the correct holder 20 and cutter 18 have been provided. An indicator light may be used to indicate successful scanning. The scanner 50 may be used to identify each components, and each component may be required to be correctly identified before the machine 12 will be usable.

Figure 14A:
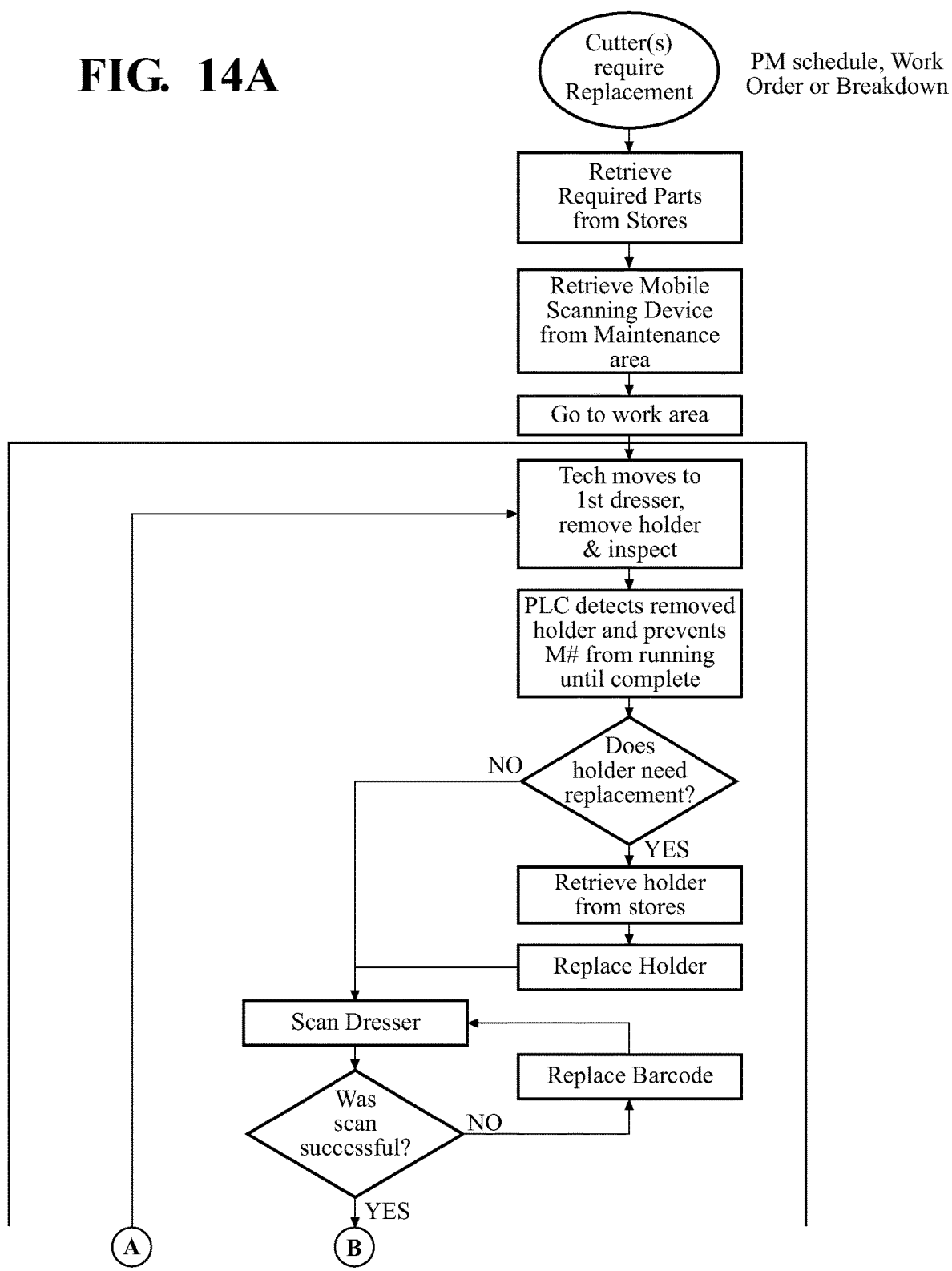
FIGS. 14A-14B illustrates a flow chart of a replacement procedure for the cutter and/or holder of the system.
Figure 14B:
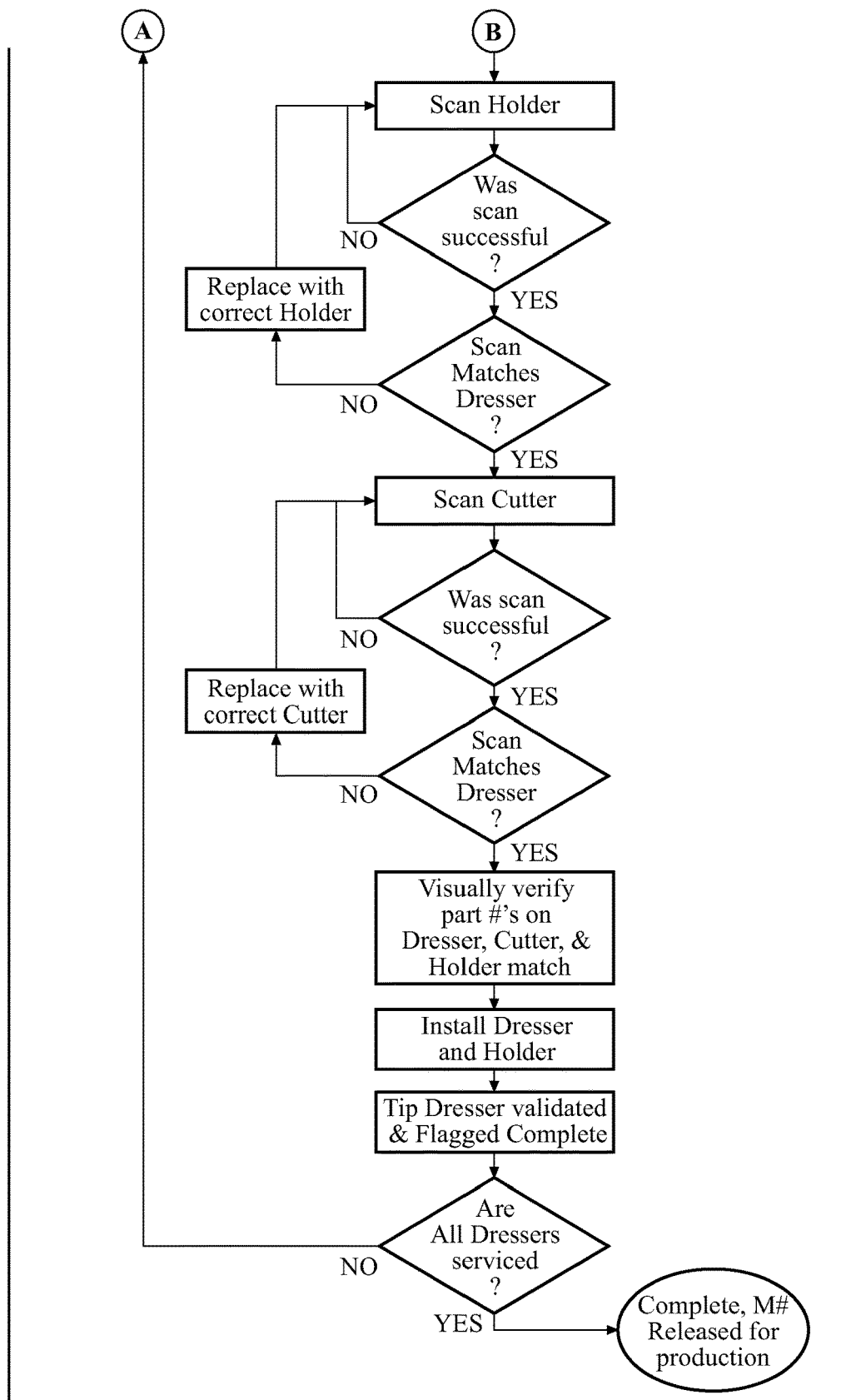

For example, with reference to the flow chart of FIG. 14, the system 10 may operate in the event the cutter 18 requires replacement. The type of contact tip may be predetermined or otherwise known in the procedure. In response to determining that the cutter 18 requires replacement, the desired cutter 18 and/or holder 20 may be retrieved from storage. The scanning device 50 may also be retrieved from its home position, such as a maintenance area, for use with the system 10 in this procedure.

Figure 2:
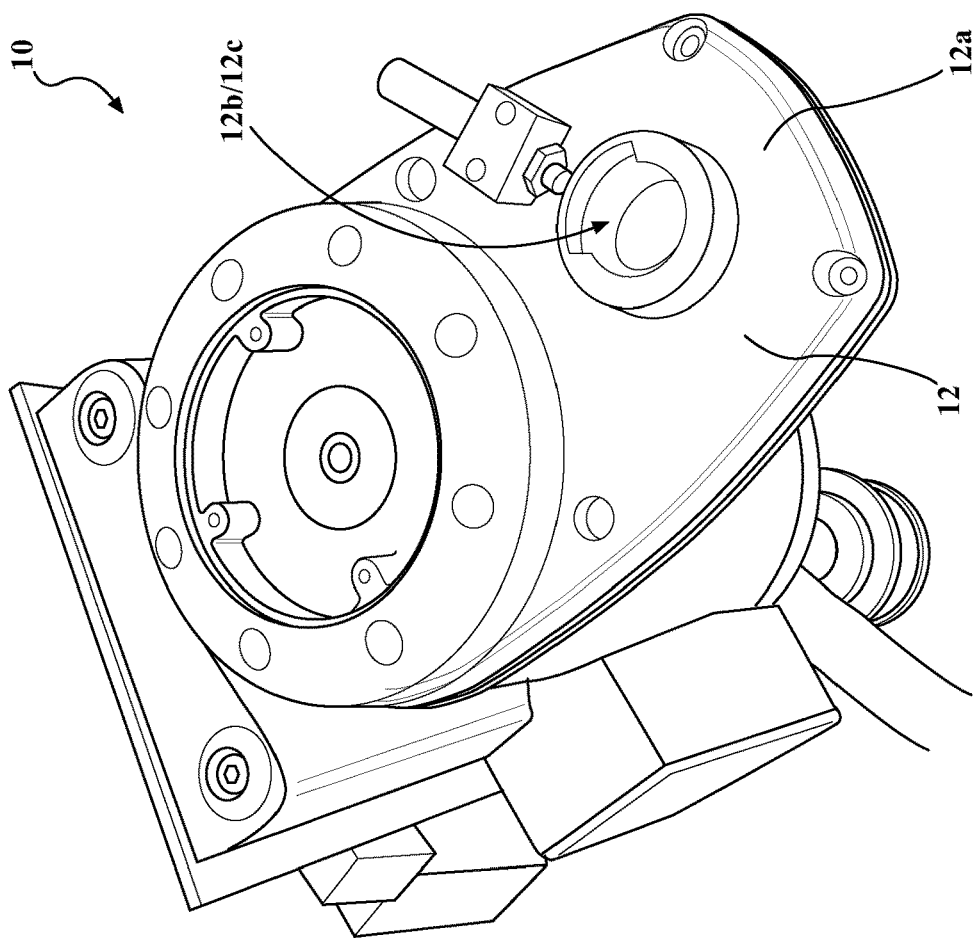
FIG. 2 is another perspective view of the tip dressing system, illustrating a ring and proximity sensor installed on a tip dressing machine.

The user may then take the scanner 50 and the selected cutter to the work area where the machine 12 is present. The user may go to the machine 12 requiring cutter replacement, and may remove the holder 20 from the machine 12. The controller 14 may detect that the holder 20 has been removed. The controller 14 may detect removal of the holder 20 via a sensor-based system. For example, as shown in FIGS. 1 and 2, the holder 20 may be secured within the machine by a ring member 12b, which when removed will cause a sensor 12c to detect that the ring member 12b has been removed.

The controller 14, having detected that the holder 20 has been removed, will prevent the machine 12 from operating until the replacement process is complete. If the holder 20 is simply replaced without confirming that it is the correct holder having the correct cutter, the machine 12 may not operate. Upon visual inspection of the holder 20, the user will determined whether the holder 20 needs to be replaced. In this case, the user may retrieve a replacement holder 20 from storage. If the holder 20 does not need to be replaced, the holder 20 may be retained and re-scanned.

With the holder 20 and cutter 18 in possession of the user, the user may then scan the machine 12. If the scan of the machine 12 fails, the user may replace the visual indicia of the machine 12 such that subsequent scans will succeed. The user may then scan the machine 12 again. The machine 12 remains generally consistent and does not often require replacement, so the user may simply confirm that the correct machine is being identified when replacing the visual indicia or scanning again.

In response to successful scan of the machine 12, the user may then scan the holder 20. If the scan fails, the user may scan the holder 20 again until the scan is successful. In response to an unsuccessful scan, the user may replace with the holder 20 with a holder 20 that may be scanned. After a successful scan of the holder 20, the controller 14 will determine whether the holder 20 matches the machine 12 that was previously scanned. If the holder 20 does not match the machine, the holder 20 may be replaced with the correct holder 20. Once the holder 20 is scanned and determined to match the machine 12, the process may continue. A matching holder 20 need not necessarily be the same holder 20, but a holder 20 that is operable with the machine 12 and that matches the identified tip dressing procedure to be performed (such as a holder that can be used for the specific contact tip being dressed).

After determining that the scanned holder 20 matches the scanned machine 12, the user may then scan the cutter 18. If the scan fails, the user may scan again. Once the scan of the cutter 18 is successful, the controller 14 may determine whether the scanned cutter 18 matches the machine 12 (and the previously scanned correct holder 20). If the cutter 18 does not match the machines 12 and/or the holder 20 for the identified operation, then the correct cutter 18 may be retrieved.

Once the correct cutter 18 has been scanned and confirmed as being correct, the user may then visually verify that the holder 20, cutter 18, and machine 12 all match. While the controller 14 has already made this determination, the visual inspection may further ensure that the correct components are on hand.

Figure 15:
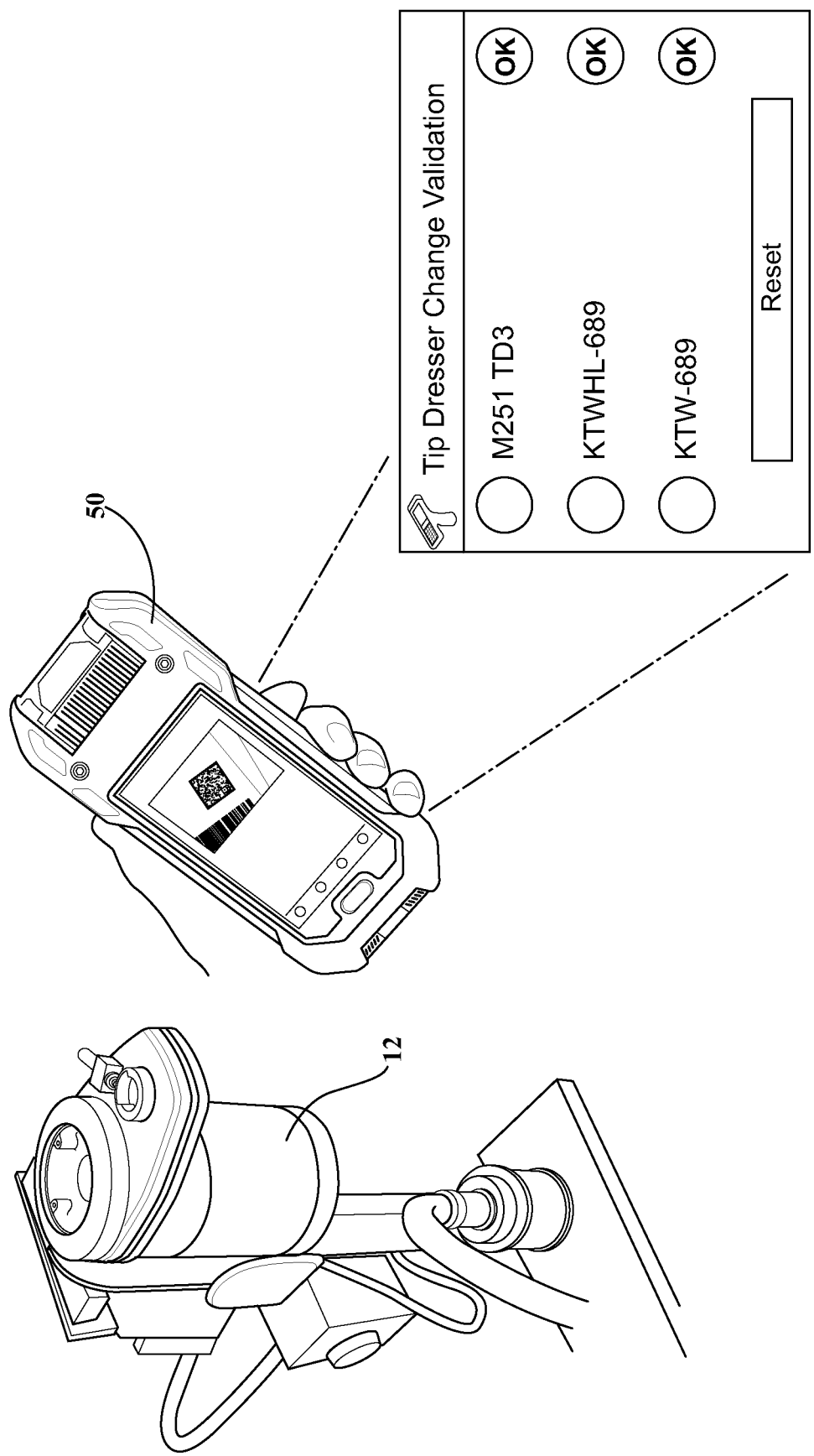
FIG. 15 illustrates an aspect of a scanning device used in the replacement procedure.

After confirming the machine 12, holder 20, and cutter 18 all match, the cutter 18 and the holder 20 may be assembled together and installed within the machine 12. The machine 12 (having the gear unit 22), holder 20, and cutter 18 may be sized and configured to be assembled if they correctly match. The machine 12 may then be validated and flagged as being complete. An example of a successful validation of components is shown in FIG. 15. However, the above described process may also be used for components that are generically shaped, due to the validation of components being accomplished by the scanning and validating process.

The above process may be repeated for other machines 12. Once all of the machines have been validated as complete, the machines 12 may then be released by the controller 14 and may be used for subsequent tip dressing operations.

The above described use of a the controller 14 and scanner 50, along with the scannable holder 20 and cutter 18, ensures that the correct holder 20 and cutter 18 are installed at a machine 12 that requires replacement of one or more of these parts. This process can therefore reduce installation errors and costly downtime or part loss that may occur from the incorrect installation or replacement of the above-described components. Similarly, the scanning procedure may reduce time spent attempting to assemble non-matching components or disassembling non-matching components that were incorrectly assembled.

In addition to the procedure outlined above to aid in the correct components being selected for installation, the system 10 may also be configured to further improve the efficiency and correct installation of the components. For example, the system 10 may be configured to ensure that the cutter 18 is correctly attached to the holder 20, and that the holder 20 is correctly attached to the machine 12 (and more particularly to the gear unit 22 of the machine 12). The holder 20 and cutter 18 may also include mechanical components and/or features to ensure that the correct cutter 18 is selected to mate with the correct holder 20, and that the correct holder 20 is selected to mate with the correct machine 12.

In one aspect, the cutter 18 may be configured such that it can only be installed to the holder 20 in one orientation. The cutter 18 has been shown as being generally symmetrical with regard to its outer profile. The outer end 35 may be in the form of a tab that is configured to mate with the holder 20. However, the cutter 18 could be flipped, with the tab still fitting against the holder 20 when the hole is centrally located. The hole through which the fastener 40 extends may therefore be disposed at an offset position relative to the center of the cutter 18.

In one aspect, the position of the hole 42 on the cutter 18 may be located in a unique position on the cutter 18 that corresponds to the specific cutter 18. Similarly, the holder 20 that corresponds to the cutter 18 may have its corresponding hole located in a position that matches the unique position of the hole 42 in the cutter 18, resulting in a correct installation as shown in FIG. 3. Thus, the specific cutter 18 can only be attached to the specific holder 20, and in the correct orientation (not upside down, for example).

Figure 16:
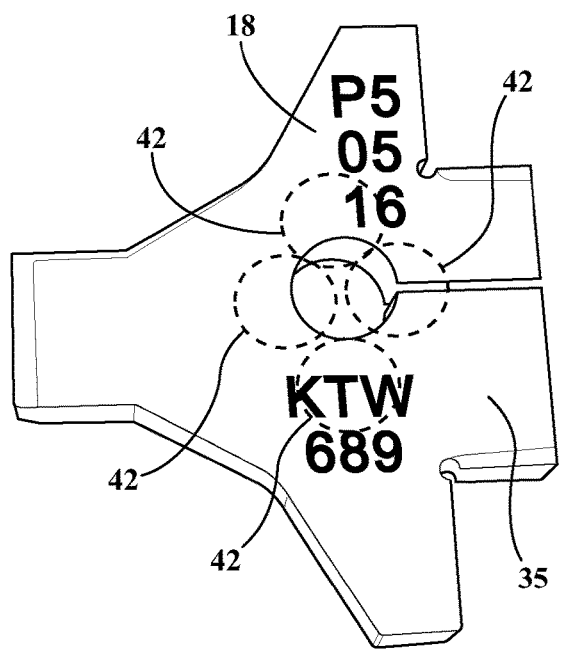
FIG. 16 illustrates a hole of the cutter that may be disposed in different locations on the cutter to control installation of a specific cutter component to a specific holder component.

In one aspect, the various cutters 18 may have different locations of the hole 42, as shown in FIG. 16. For example, for a first cutter 18, the hole 42 may be offset upward, and the corresponding first holder 20 may have a similarly offset hole. A second cutter 18 may have the hole 42 offset downward, and a second holder 20 for this second cutter 18 may have a corresponding hole that is offset downward. Thus, the first cutter 18 will not be permitted to be installed on the second holder 20 because the holes do not align.

In another aspect, the outer end 35 in the form of a tab may have an offset shape that will only mate with the holder 20 that corresponds to the specific cutter 18.

The holder 20 may also have features that prevents holder from being installed on the wrong machine 12. In one aspect, shown in FIGS. 5-8, the holder 20 may include a pin 20*a* that projects downward from the flange 26. The gear unit 22 may include a corresponding hole into which the pin 20*a* is received. As described above, the fasteners attaching the holder 20 to the gear unit 22 may be on diametrically opposite sides of the holder 20. Thus, the holder 20 could be installed at two different orientations relative to the gear unit 22. The structure of holder 20 described above that corresponds to the structure of the gear unit 22 may be referred to as holder-gear structure. The structure of the gear unit 22 described above that corresponds to the structure of the holder 20 may be referred to as gear-holder structure.

The projection 24 described above may be disposed at a diametrically opposite side relative to the hole 22*a* for the pin 20*a*. Thus, if the holder 20 is inserted incorrectly, the pin 20*a* will contact the projection 24 and the holder 20 will be prevented from being attached to the gear unit 22. The location of the pin 20*a* relative to the installation holes in the flange 26 may be varied for different holders 20, thereby preventing the installation of the holder 20 into the wrong type of gear unit 22. Accordingly, only the holder 20 with the correct pin location will be able to be attached to the gear unit 22 where installation is intended.

While the above described aspect describes a pin-and-hole arrangement or aligned hole arrangement, it will be appreciated that other types of corresponding structure may be used to ensure that the components are assembled properly, with other structure in place that will block or prevent the components from being assembled incorrectly. Accordingly, the corresponding structures and blocking structures described herein shall not be interpreted as being limited only to those explicitly described. For example, the pin may be in the form of another shaped projection, and the hole may be a slot or other corresponding recess into which the projection is received. In another aspect, the components may have a non-symmetrical cooperating shape. The components may include a splined profile or a profile with a complex curvature. In short, when the components are correctly aligned, assembly of the components is possible. When the components are not aligned correctly, the components may interfere with each other, requiring a re-alignment for a successful assembly. The various corresponding structures may also be used to prevent installation of a component that does not match the other components. For example, a specific type of cutter 18 may only be able to be assembled with a specific type of holder 20, such that a non-matching cutter 18 will not be able to be assembled with a non-matching holder 20, regardless of the orientation of the cutter 18. Similarly, a non-matching holder 20 will not be able to be assembled with a non-matching gear unit 22, regardless of the orientation.

Thus, the gear unit 22, the holder 20, and the cutter 18 may all be formed with specific cooperating structure that define specific components that may only mate with corresponding components. Accordingly, if an incorrect holder 20 and/or cutter 18 is selected and installation is attempted, the cutter 18 may not be attachable with the holder 20, and/or the holder 20 may not be attachable to the gear unit 22.

Thus, correct installation of the desired components can be controlled even without the use of the scanning device 50 method described above. However, the mechanical control aspect that limits installation may also be used along with the scanning device 50 and the control method described above. For example, it is possible that after the parts are scanned, the part could be misplaced or replaced accidentally with a different part. However, an attempt to install the different part would fail due to the mechanical restrictions that limit installation in the event of parts being assembled that do not correspond.

Thus, in view of the above, the above-described system 10 includes multiple aspects for reducing installation errors. The system 10 may prevent activation of the machine 12 until the correct components have been scanned and installed. The system 10 may also restrict installation mechanically by altering various corresponding structure between corresponding components, such that an attempted installation of the incorrect component will prevent installation.

Thus, even with the various components appearing similarly due to similar sizes and shapes, the correct components may be selected with confidence. Accidental mixing of parts within part storage may still occur, but the incorrect part pulled from the desired bin may be prevented from being installed. Parts may be installed with confidence with limited concern that the part is incorrect, reducing time spent manually checking and re-checking part numbers Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:
1. A tip dressing system for a contact tip, the system comprising:
  a gear unit configured for being driven by a tip dressing machine, the gear unit defining an opening extending axially therethrough;
  a holder sized and configured for being received in the opening of the gear unit and for being fixedly attached thereto;
  a cutter sized and configured for being fixedly attached to the holder; and
  wherein the cutter includes cutter-holder structure corresponding to the holder, and the holder includes holder-cutter structure corresponding to the cutter, the cutter-holder structure and the holder-cutter structure allowing a successful installation of the cutter to the holder when the cutter-holder structure and the holder-cutter structure satisfy a predetermined relationship between the cutter and the holder, wherein the cutter-holder structure and the holder-cutter structure also prevent installation of the cutter to the holder when the predetermined relationship between the cutter and the holder is not satisfied;
  wherein the holder includes holder-gear structure corresponding to the gear unit, and the gear unit includes gear-holder structure corresponding to the holder, the holder-gear structure and the gear-holder structure allowing a successful installation of the holder to the gear unit when the holder-gear structure and the gear-holder structure satisfy a predetermined relationship between the holder and the gear unit, wherein the holder-gear structure and the gear-holder structure also prevent installation of the holder to the gear unit when the predetermined relationship between the holder and the gear unit is not satisfied;
  wherein the holder has a partial annular body with a partial circumferential outer surface sized for being received within a circumferential inner surface of the gear unit, and the holder further includes an upper flange portion extending radially outward from the partial annular body;
  wherein the partial annular body has a lower axial end defining a lowermost end of the holder and the upper flange portion has an upper axial end defining an uppermost end of the holder, where the upper flange portion has a lower axial end that axially corresponds to an upper axial end of the partial annular body, wherein the partial annular body extends axially from the upper flange portion to the lowermost end of the holder, wherein the partial annular body does not include a further flange portion at the lowermost end, and a radial extent of the lowermost end is smaller than a radial extent of the upper flange portion;
  wherein the holder is insertable in a downward direction into the opening of the gear unit, such that the upper flange portion abuts a corresponding generally planar surface of the gear unit, such that the holder rests against the gear unit when the predetermined relationship between the holder and the gear unit is satisfied;
  wherein the gear unit includes a radial projection extending radially inward from the inner surface;
  wherein the holder-gear structure of the holder includes an axial projection in the form of a pin extending downward from the upper flange portion, wherein the gear-holder structure of the gear unit includes a hole in the gear unit, wherein the pin is received within the hole in the gear unit when the holder is successfully installed to the gear unit according to the predetermined relationship between the holder and the gear unit, wherein the pin contacts the radial projection of the gear unit in a first rotational orientation of the holder relative to the gear unit, which contact of the pin with the radial projection blocks downward insertion of the holder to prevent the successful installation of the holder to the gear unit, and wherein the pin is aligned with and receivable in the hole in a second rotational orientation of the holder relative to the gear unit so that the holder can be successfully installed to the gear unit;
  wherein the upper flange portion includes a pair of through holes on diametrically opposite sides such that, when the holder is concentrically aligned with the gear unit, the through holes are aligned with corresponding recesses in the gear unit when the holder is at each of two different rotational orientations that are 180 degrees apart relative to one another;
  wherein the pin is received in the hole in the gear unit when the holder is in the second rotational orientation relative to the gear unit, and wherein the pin contacts and interferes with the radial projection and blocks downward insertion of the holder when the holder is in the first rotational orientation relative to the gear unit.

2. The system of claim 1, wherein, when the holder is installed successfully in the gear unit according to the predetermined relationship between the holder and the gear unit, the partial annular body is received within the inner surface of the gear unit and the upper flange portion abuts the corresponding generally planar surface of the gear unit in an axial direction, and when the predetermined relationship between the holder and the gear unit is not satisfied and the holder is not installed successfully in the gear unit, the partial annular body is received within the inner surface but the upper flange portion is prevented from abutting the corresponding generally planar surface of the gear unit.

3. The system of claim 1, wherein the radial projection is diametrically opposite the hole in the gear unit in which the pin is received.

4. The system of claim 1, wherein the cutter has a radially inner and a radially outer end, wherein the radially outer end is wider than the radially inner end.

5. The system of claim 4, wherein the cutter includes a cutter hole, wherein the cutter hole is disposed radially between the radially inner end and the radially outer end and is disposed vertically between an upper end and a lower end of the cutter, wherein the cutter hole overlaps a corresponding holder hole of the holder when the cutter and the holder satisfy the predetermined relationship between the cutter and the holder.

6. The system of claim 5, wherein the cutter hole is offset on the cutter above or below relative to a center of the cutter defined between the upper and lower end of the cutter, and, when the cutter is successfully installed to the holder, the cutter hole overlaps the holder hole, and wherein the cutter hole does not overlap the holder hole of the holder when the holder and the cutter do not satisfy the predetermined relationship between the cutter and the holder.

7. The system of claim 4, wherein the cutter further includes a wing portion, wherein the wing portion and the radially inner end of the cutter define a cutting edge.

8. The system of claim 7, wherein the cutting edge is disposed adjacent a recess defined by the holder, wherein the recess is configured to receive a contact tip therein for tip dressing.

9. The system of claim 1, further comprising the tip dressing machine, wherein the gear unit is disposed within the tip dressing machine.

10. The system of claim 9, wherein the tip dressing machine includes a sensor, wherein the sensor detects removal of the holder from the gear unit.

11. The system of claim 10, wherein the tip dressing machine, based on signals from the sensor, is automatically prevented from operating in response to removal of the holder.

* * * * *